(12) United States Patent
Crystal

(10) Patent No.: US 11,846,187 B2
(45) Date of Patent: Dec. 19, 2023

(54) MINING PIN RETENTION SYSTEM

(71) Applicant: ITR America, LLC, Pearl, MS (US)

(72) Inventor: Clayton A Crystal, Brandon, MS (US)

(73) Assignee: ITR America, LLC, Pearl, MS (US)

( * ) Notice: Subject to any disclaimer, the term of this patent is extended or adjusted under 35 U.S.C. 154(b) by 401 days.

(21) Appl. No.: 16/117,926

(22) Filed: Aug. 30, 2018

(65) Prior Publication Data

US 2019/0063217 A1 Feb. 28, 2019

Related U.S. Application Data

(60) Provisional application No. 62/552,153, filed on Aug. 30, 2017.

(51) Int. Cl.
| | | |
|---|---|---|
| *E21C 25/36* | (2006.01) | |
| *E21C 25/56* | (2006.01) | |
| *F16G 15/06* | (2006.01) | |
| *F16G 15/00* | (2006.01) | |

(52) U.S. Cl.
CPC ............. *E21C 25/36* (2013.01); *E21C 25/56* (2013.01); *F16G 15/06* (2013.01); *F16G 15/00* (2013.01)

(58) Field of Classification Search
CPC .......... E21C 25/34; E21C 25/36; E21C 25/56; Y10T 403/32893; E02F 9/2825; E02F 9/2833; E02F 9/2841; F16G 13/06; F16G 13/07; F16G 15/00; F16G 15/06; F16B 37/14; F16B 39/34; F16B 19/02; F16B 21/125
See application file for complete search history.

(56) References Cited

U.S. PATENT DOCUMENTS

| | | |
|---|---|---|
| 1,011,398 A | 12/1911 | Andregg |
| 1,838,139 A | 12/1931 | Fitch |
| 2,129,420 A | 9/1938 | Guy |
| 2,162,811 A | 6/1939 | Guy |
| 2,340,873 A | 2/1944 | Fulke |
| 2,450,694 A | 10/1948 | Sauer |
| 2,452,242 A | 10/1948 | Johnson |
| 2,541,157 A | 2/1951 | Fulke |
| 2,846,248 A | 8/1958 | Kliwer |

(Continued)

FOREIGN PATENT DOCUMENTS

| | | |
|---|---|---|
| AU | 631968/90 B | 7/1992 |
| CN | 2021176672 U | 3/2012 |

(Continued)

OTHER PUBLICATIONS

'Nuts (hardware)' (Wikipedia) May 26, 2015. Retrieved from the internet on Aug. 9, 2016. URL :<https://web.archive.org/web/20150526221608/https://en.wikipedia.org/wiki/Nut_(hardware)>.

*Primary Examiner* — Matthew R McMahon
(74) *Attorney, Agent, or Firm* — Butler Snow LLP

(57) ABSTRACT

Several embodiments of a drive pin retention system for mining chains comprise a drive pin, dowel pin, and retainer, wherein the dowel pin is fitted through the holes of a retainer aligned with the holes of the dowel pin and pressed with force so that the tolerance between the dowel pin and retainer is very close. In one embodiment, the retainer is tack welded and then the dowel pin is tack welded to further increase the tolerance and prevent loosening or movement of the retainer due to vibration.

3 Claims, 17 Drawing Sheets

(56) References Cited

U.S. PATENT DOCUMENTS

| | | | |
|---|---|---|---|
| 3,086,404 A * | 4/1963 | Krekeler | E21C 25/36 |
| | | | 474/223 |
| 3,198,563 A | 8/1965 | Steidl | |
| 3,200,690 A * | 8/1965 | Dickman | F16B 19/02 |
| | | | 411/337 |
| 3,240,100 A * | 3/1966 | Rose | F16B 19/02 |
| | | | 411/452 |
| 3,638,980 A | 2/1972 | Kleinhenn | |
| 3,679,265 A | 7/1972 | Krekeler | |
| 3,787,091 A | 1/1974 | Paolini et al. | |
| 3,788,711 A | 1/1974 | Krekler | |
| 3,888,133 A | 6/1975 | Krekeler | |
| 3,968,995 A | 7/1976 | Arentzen | |
| 4,019,550 A | 4/1977 | De Haitre | |
| 4,130,369 A * | 12/1978 | Wojcik | F16B 19/02 |
| | | | 411/501 |
| 4,221,252 A * | 9/1980 | Bruce | F16B 39/04 |
| | | | 403/155 |
| 4,233,761 A | 11/1980 | Ryerson | |
| 4,260,029 A * | 4/1981 | Morrison | E21B 19/24 |
| | | | 175/220 |
| 4,337,614 A * | 7/1982 | Briscoe | F16G 15/06 |
| | | | 411/518 |
| 4,516,340 A | 5/1985 | Launder | |
| 4,600,343 A | 7/1986 | Frerejacques | |
| 4,674,803 A | 6/1987 | Sterwerf, Jr. | |
| 4,689,904 A * | 9/1987 | Briscoe | E02F 3/60 |
| | | | 37/399 |
| 4,717,206 A * | 1/1988 | Sterwerf, Jr. | E21C 27/26 |
| | | | 299/82.1 |
| 4,729,754 A | 3/1988 | Thuerman | |
| 4,823,486 A * | 4/1989 | Diekevers | E02F 9/2841 |
| | | | 37/456 |
| 4,936,612 A * | 6/1990 | Kohn | G09F 3/0317 |
| | | | 292/324 |
| 5,009,017 A * | 4/1991 | Diekevers | E02F 9/2841 |
| | | | 37/456 |
| 5,031,964 A | 7/1991 | Meisel et al. | |
| 5,144,762 A | 9/1992 | Robinson | |
| 5,242,238 A | 9/1993 | Warner et al. | |
| 5,286,130 A | 2/1994 | Mueller | |
| 5,305,872 A | 4/1994 | Hutton | |
| 5,329,862 A | 7/1994 | Breezer et al. | |
| 5,367,798 A * | 11/1994 | Hughes | E02F 3/60 |
| | | | 37/397 |
| 5,405,398 A * | 4/1995 | Buford, III | A61F 2/3886 |
| | | | 623/20.27 |
| 5,607,248 A | 3/1997 | Hasse | |
| 5,865,557 A * | 2/1999 | Kasim | E02F 9/006 |
| | | | 403/79 |
| 5,927,665 A * | 7/1999 | Grabnic | E02F 3/3604 |
| | | | 248/200 |
| 5,927,780 A | 7/1999 | Changler | |
| 6,010,171 A | 1/2000 | Margiottiello | |
| 6,070,945 A * | 6/2000 | Ritchey | E21C 35/197 |
| | | | 299/107 |
| 6,530,165 B2 | 3/2003 | Griesemer et al. | |
| 6,648,803 B1 | 11/2003 | Jay | |
| 6,662,681 B2 * | 12/2003 | Crane | E02F 3/3613 |
| | | | 248/200 |
| 6,691,438 B2 * | 2/2004 | Fatemi | E02F 3/3627 |
| | | | 37/468 |
| 6,698,932 B2 * | 3/2004 | Hamaguchi | E02F 9/006 |
| | | | 384/275 |
| 6,735,891 B2 | 5/2004 | Moreno et al. | |
| 6,913,411 B2 | 7/2005 | Yamakawa et al. | |
| 6,938,732 B2 | 9/2005 | Garbagnati | |
| 6,991,094 B2 | 1/2006 | Frost | |
| 7,014,139 B2 | 3/2006 | Schanke et al. | |
| 7,056,073 B2 | 6/2006 | Ardo | |
| 7,086,185 B2 | 8/2006 | Pasqualini et al. | |
| 7,237,375 B2 | 7/2007 | Humcke et al. | |
| 7,246,699 B2 | 7/2007 | Frost et al. | |
| 7,253,534 B2 | 8/2007 | Vasilovich et al. | |
| 7,343,730 B2 | 3/2008 | Humcke et al. | |
| 7,364,381 B2 * | 4/2008 | Seib | A01B 51/04 |
| | | | 403/151 |
| 7,448,823 B2 * | 11/2008 | Silva | F16G 15/06 |
| | | | 403/325 |
| 7,523,572 B2 | 4/2009 | Pasqualini | |
| 7,600,633 B2 | 10/2009 | Rathbun et al. | |
| 7,707,755 B2 | 5/2010 | Almendros et al. | |
| 7,730,652 B2 | 6/2010 | McClanahan et al. | |
| 7,862,277 B2 | 1/2011 | Dingwall et al. | |
| 8,171,715 B2 * | 5/2012 | Segura | F16G 15/06 |
| | | | 59/86 |
| 8,381,363 B2 * | 2/2013 | Boeckman | F16B 45/00 |
| | | | 24/132 WL |
| 8,662,784 B2 | 3/2014 | Cocayne | |
| 8,677,727 B2 * | 3/2014 | Robins | F16G 15/06 |
| | | | 59/86 |
| 8,769,799 B2 * | 7/2014 | Emmerich | F16B 35/04 |
| | | | 29/525.02 |
| 8,801,024 B2 | 8/2014 | Grainger | |
| 8,807,669 B2 | 8/2014 | McPhail et al. | |
| 8,991,791 B2 | 3/2015 | Wright et al. | |
| 9,038,360 B1 * | 5/2015 | Moreau | F16G 15/06 |
| | | | 59/86 |
| 9,067,766 B1 | 6/2015 | Bateman et al. | |
| 9,086,118 B2 | 7/2015 | Campbell et al. | |
| 9,283,904 B2 | 3/2016 | Parenti | |
| 9,333,572 B2 * | 5/2016 | McDonough | B27B 21/06 |
| 9,476,184 B2 * | 10/2016 | Wallis | E02F 9/2833 |
| 9,482,314 B2 | 11/2016 | Nishizawa et al. | |
| 9,624,966 B1 * | 4/2017 | Obleman | H01Q 1/084 |
| 9,868,488 B2 | 1/2018 | Hackl | |
| 9,903,440 B2 * | 2/2018 | Ohman, III | F16G 15/06 |
| 9,927,034 B2 * | 3/2018 | Abouelleil | F16K 1/2266 |
| 10,364,553 B2 | 7/2019 | Snyder | |
| 10,645,853 B2 * | 5/2020 | Kovach | A01B 23/02 |
| 10,774,594 B2 * | 9/2020 | Zhang | E21B 10/567 |
| 10,907,328 B2 * | 2/2021 | Ortiz Garcia | E02F 9/2841 |
| 10,982,540 B2 | 4/2021 | Crystal | |
| 2006/0231820 A1 | 10/2006 | Bilby | |
| 2006/0255653 A1 * | 11/2006 | Gibbins | E02F 9/2841 |
| | | | 301/43 |
| 2007/0107412 A1 | 5/2007 | Humcke et al. | |
| 2008/0256832 A1 | 10/2008 | Esti | |
| 2010/0050402 A1 | 3/2010 | Rissman | |
| 2011/0283819 A1 | 11/2011 | Paulus | |
| 2013/0266395 A1 | 10/2013 | Schuster et al. | |
| 2014/0086702 A1 | 3/2014 | Imai et al. | |
| 2014/0331480 A1 | 11/2014 | Warner | |
| 2016/0032722 A1 | 2/2016 | Crystal | |
| 2016/0265254 A1 | 9/2016 | Carnevali | |
| 2017/0328398 A1 | 11/2017 | Bradshaw | |
| 2018/0359929 A1 | 12/2018 | Hansson et al. | |
| 2019/0376254 A1 * | 12/2019 | Stolz | F16C 11/10 |

FOREIGN PATENT DOCUMENTS

| | | |
|---|---|---|
| GB | 302094 A | 12/1928 |
| GB | 760941 A | 10/1954 |
| JP | 60125783 A | 7/1985 |

* cited by examiner

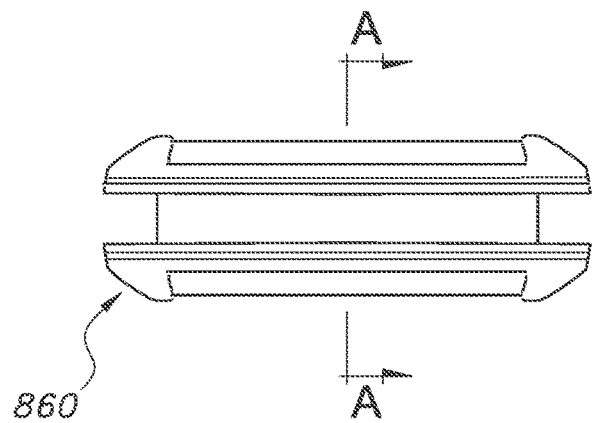
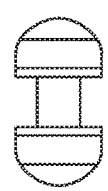
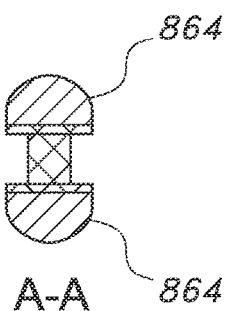
FIG. 3A    FIG. 3B    FIG. 3C
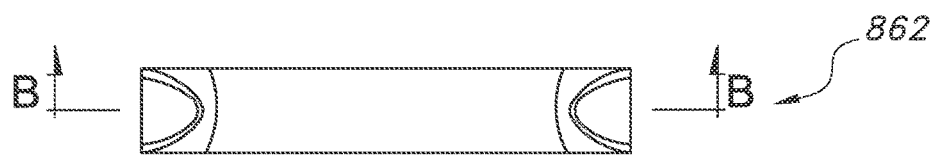
FIG. 3D
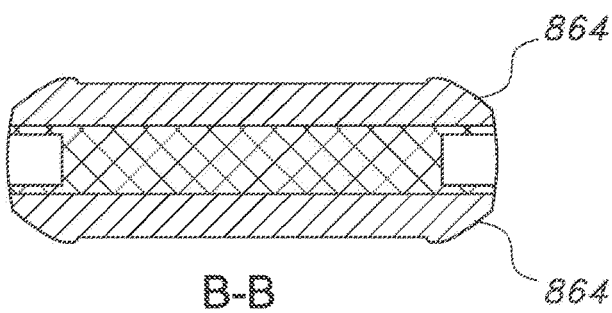
FIG. 3E

MINING PIN RETENTION SYSTEM

CROSS-REFERENCE TO RELATED APPLICATION

This application claims the benefit of U.S. Provisional Application No. 62/552,153 filed Aug. 30, 2017, which is incorporated herein by reference in its entirety.

FIELD OF THE INVENTION

The present invention relates to an apparatus for securing mining chain links.

BACKGROUND OF THE INVENTION

Cutting chains are frequently found in mining operations, including in continuous longwall miners. These chains have tool bits mounted to them that act as picks to repeatedly break apart the surface being mined as the chain is driven around a sprocket.

Although these mining chains are well known in the prior art, previously known mining chains are prone to failure due to breakage rather than normal wear.

One frequent area for failure of the mining chain occurs in the connection between links. The links of a mining chain are connected together by drive pins. Newer designs of mining chain links also employ drive pins. However, previously known retention systems for the drive pin use dowel pins that can shear or break from lateral force or contact with the mining material. When this occurs, the chain breaks and the miner fails.

The breakage of the chains results in significant downtime and loss of productivity as the continuous longwall miner can no longer function until the chains are repaired or replaced. We disclose herein a drive pin retention mechanism that does not suffer from the problems of the prior art.

SUMMARY OF THE INVENTION

We disclose herein a new drive pin retention system for use in mining chains and other chains comprising: a drive pin having a pin, with retainer cap and various locking mechanisms for securing the retainer cap to the drive pin.

BRIEF DESCRIPTION OF THE DRAWINGS

Further advantages of the invention will become apparent by reference to the detailed description of preferred embodiments when considered in conjunction with the drawings:

FIG. 2A depicts a drive pin, and FIG. 2B depicts a retainer.

FIG. 3A-3E depicts a rubber sandwich pin to be used with the drive pin of FIG. 2. Individually, FIG. 3A depicts a perspective view of the rubber sandwich pin. FIG. 3B depicts a side elevational view of FIG. 3A. FIG. 3C depicts a cross section along plane A-A of FIG. 3A. FIG. 3D depicts a side elevational view of the rubber sandwich pin. FIG. 3E depicts a cross section along plane B-B of FIG. 3D.

FIG. 5A depicts a D-shaped drive pin and retainer secured with a steel spring pin. FIG. 5B depicts a D-shaped drive pin. FIG. 5C depicts a retainer.

FIG. 5D depicts a perspective view of a steel spring pin. FIG. 5E depicts a side elevational view of the steel spring pin.

FIG. 11A depicts a drive pin retention system. FIG. 11B depicts a retainer ring. FIG. 11C depicts a plastic seal. FIG. 11D depicts a dowel pin.

FIG. 12A depicts a drive pin retention system. FIG. 12B depicts a retaining cap.

FIG. 13A depicts a drive pin retention system. FIG. 13B depicts a bolt secured by a nylon insert lock nut, also known as a nyloc nut.

DETAILED DESCRIPTION

Figure 1:
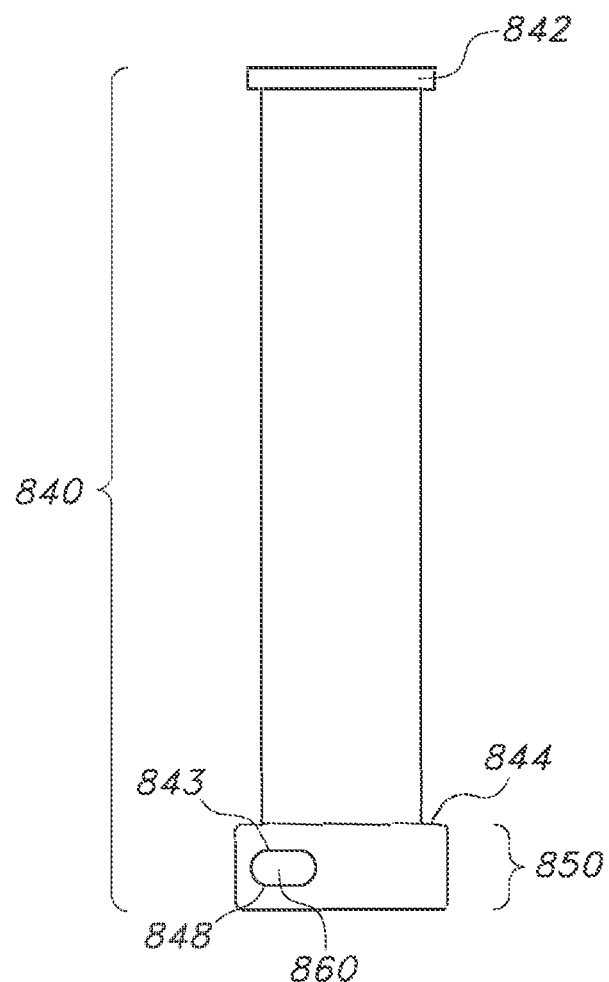
FIG. 1 depicts a perspective view of the presently disclosed drive pin with retention mechanism attached using a rubber sandwich pin.
Figure 2A:
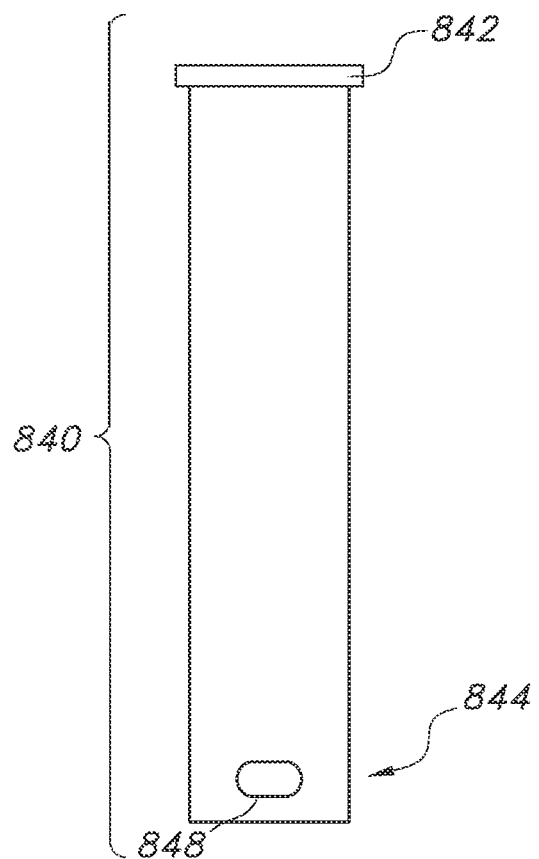
FIGS. 2A and 2B depict a diagram of a drive pin and retainer used with a perpendicular rubber sandwich pin. Individually.
Figure 2B:
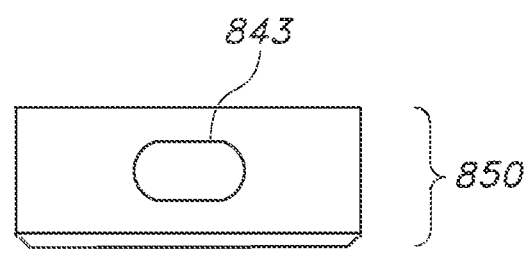
Figure 4:
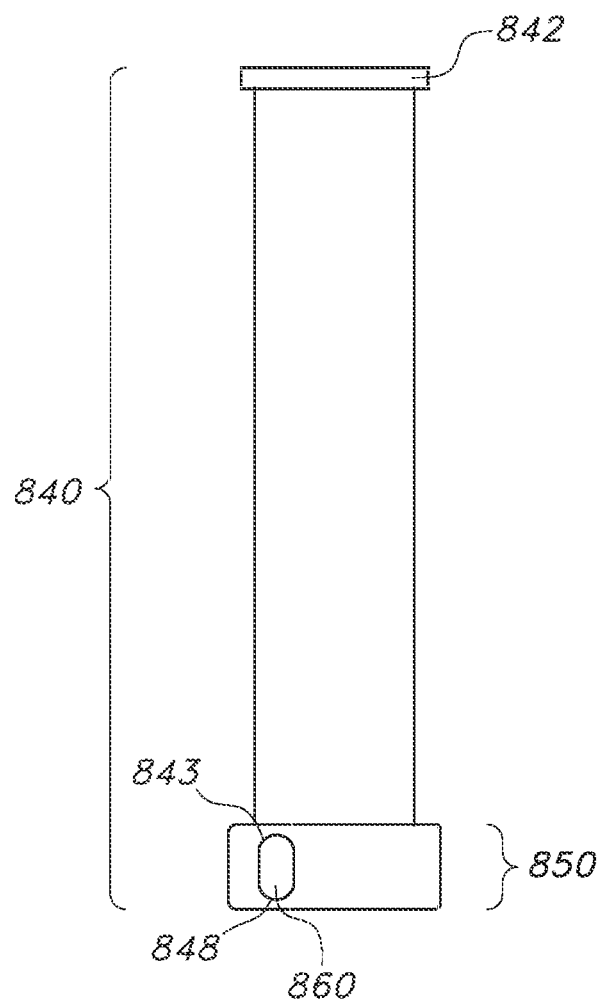
FIG. 4 depicts a drive pin and retainer secured with a rubber sandwich pin oriented in line with the drive pin.
Figure 5A:
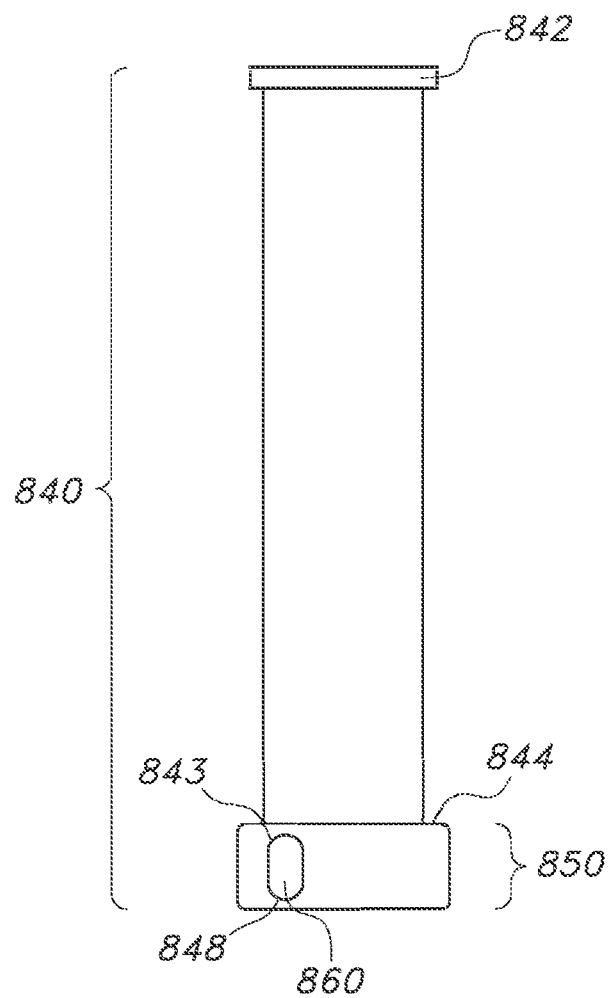
FIG. 5A-5E depicts a D-shaped drive pin and retainer secured with a steel spring pin. Individually.
Figure 5B:
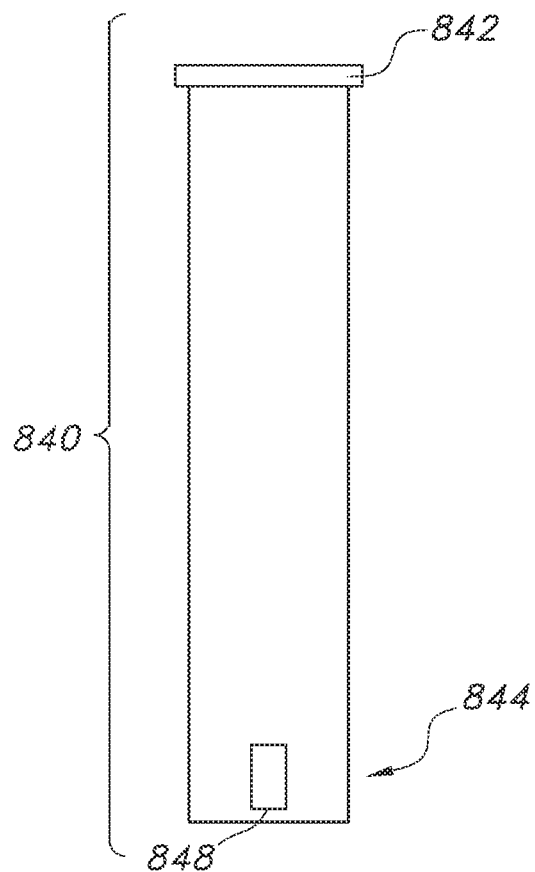
Figure 5C:
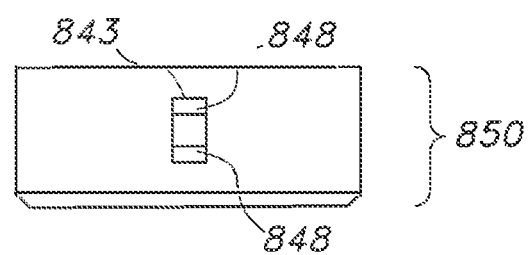
Figure 5D:
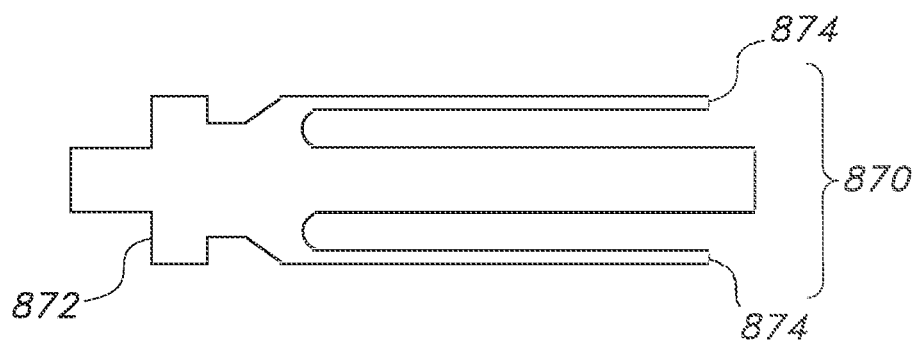
Figure 5E:
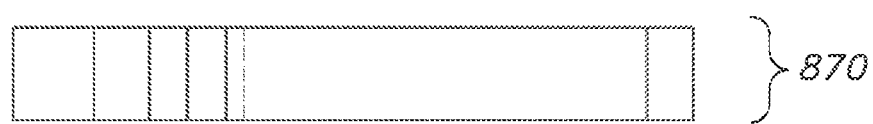

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

A common point of failure in mining chains of the prior art is in the retention mechanism that holds the drive pins 840 (also known as pivot pins) in place. The drive pin 840 is a generally cylindrically-shaped pin that passes through the transverse bores 410 of the mining chain links. It has a pin head 842 on one end and a fastener end 844 at the opposite end.

Often, in the prior art, the drive pin 840 was held in place by a retainer 850 that surrounds the fastener end 844 of the drive pin 840. A dowel pin was driven through a hole 843 in the retainer 850, and through the drive pin hole 848 in the side of the drive pin 840. The dowel pin protruded through the retainer 850, and could easily shear or break from the lateral force or contact with the mining material. When this occurs, the mining chain would break, and the miner fails. Some prior art roller links had protective rings surrounding the retainer that were intended to contain the dowel pin in its location. However, this protective ring could break off, and because there is no positive retention holding the dowel pin in, it could slide out.

In the presently disclosed invention, the drive pin has a retainer 850 held on by dowel pins that are substantially flush with the retainer. In one embodiment, such as depicted in FIGS. 2, 3, 4 and 5, a rubber sandwich pin 860 is used. The rubber sandwich pin 860, as shown in FIG. 3A-E, is constructed of two pieces of elongated metal 864 with a rubber center 862 between them. The rubber center 862 is typically injected into the mold between the elongated metal pieces 864, causing it to adhere to the two elongated metal pieces 864. As can be seen from FIG. 3A and FIG. 3B, the elongated metal pieces 864 are angled inwards toward the ends, with a middle section that is narrower. As the rubber sandwich pin 860 is driven into the drive pin hole 848, it is compressed, and re-expands as it exits the other side of the drive pin 840. This positive retention prevents the rubber sandwich pin 860 from sliding out of the drive pin hole 848.

In another embodiment, as shown in FIG. 5A-5E, a steel spring pin 870 is used. The steel spring 870 depicted in FIGS. 5D and 5E has three prongs and a handle 872. As the steel spring 870 is pushed into the drive pin hole 848 of the drive pin shown in FIG. 5B, the outer prongs 874 extend outward as they pass into the interior of the drive pin hole 848. Because of the spring force of the outer prongs 874 against the retainer 850 shown in FIG. 5C, the steel spring does not easily come out from the retainer pin hole 843 aligned with the drive pin 848 hole. Once again, this positive retention keeps the steel spring pin from sliding out of the drive pin hole 848.

Because this rubber sandwich pin 860 or steel spring pin 870 does not substantially protrude past the retainer 850, there is a significantly reduced chance that either pin will become damaged resulting in the retainer 850 separating from the drive pin 840.

Other potential retainers and dowel pins are shown in FIGS. 7 to 15. In another embodiment, a Hendrix pin or threaded steel pin with a castle nut is used. The castle nut can be held in place using a cotter pin. This is an excellent solution for repairs.

Figure 6:
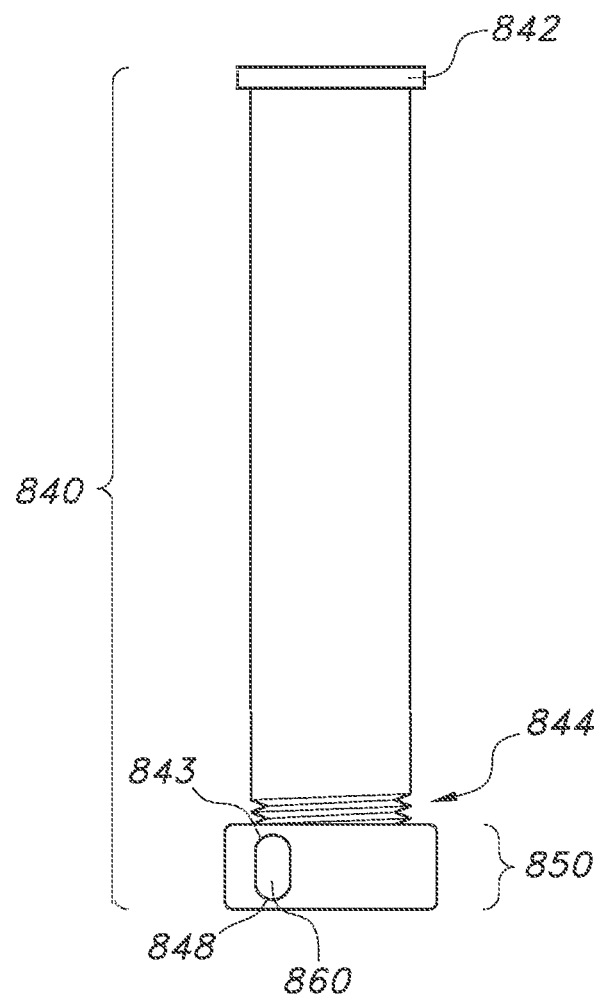
FIG. 6 depicts a threaded drive pin with retainer secured with a rubber sandwich pin oriented in line with the drive pin.
Figure 7:
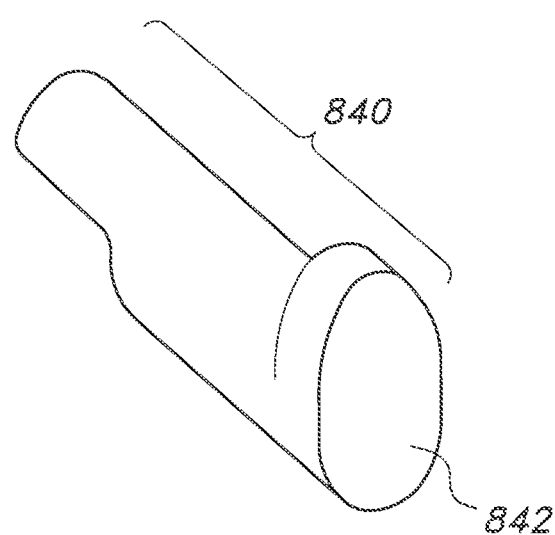
FIG. 7 depicts a perspective view of a pivot pin.
Figure 8:
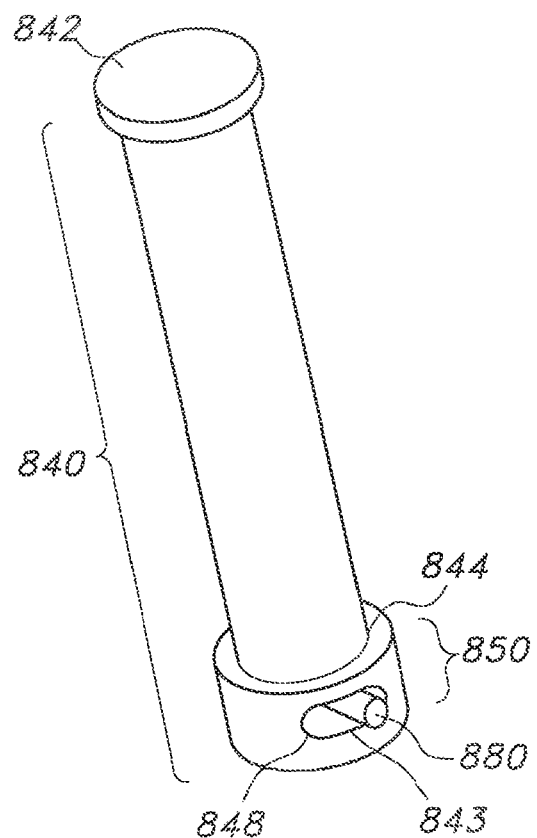
FIG. 8 depicts a perspective view of the presently disclosed mining pin.
Figure 9:
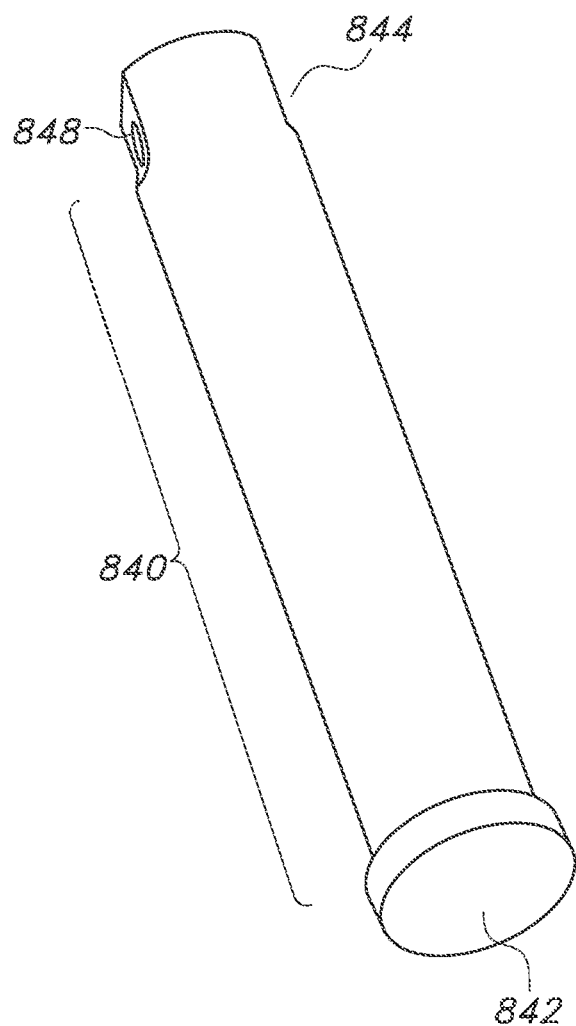
FIG. 9 depicts a perspective view of another embodiment of the presently disclosed mining pin.
Figure 10:
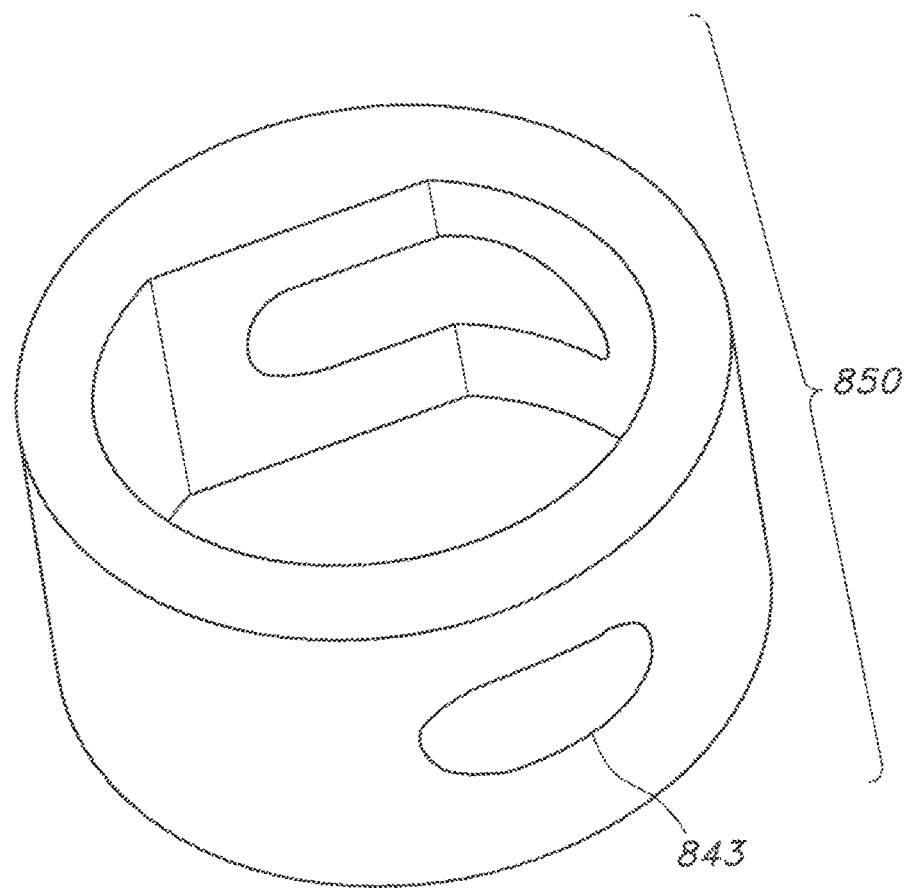
FIG. 10 depicts a perspective view of the presently disclosed mining pin retainer.

The presently disclosed drive pin retention system can be used with any shaped retainer 850 that fits over the fastener end 844 of the drive pin 840. In one embodiment as shown in FIGS. 8, 9 and 10, a D-shaped retainer is used in applications where the drive pin 840 has at least one flat surface cut into the curved sidewall of the drive pin. In another embodiment, such as that shown in FIG. 6, the drive pin 840 can be threaded such that the retainer 850 screws into place. Once the holes 843 in the retainer 850 and the drive pin hole 848 are aligned, a rubber sandwich pin or steel spring pin can be placed into the hole 848.

Figure 11A:
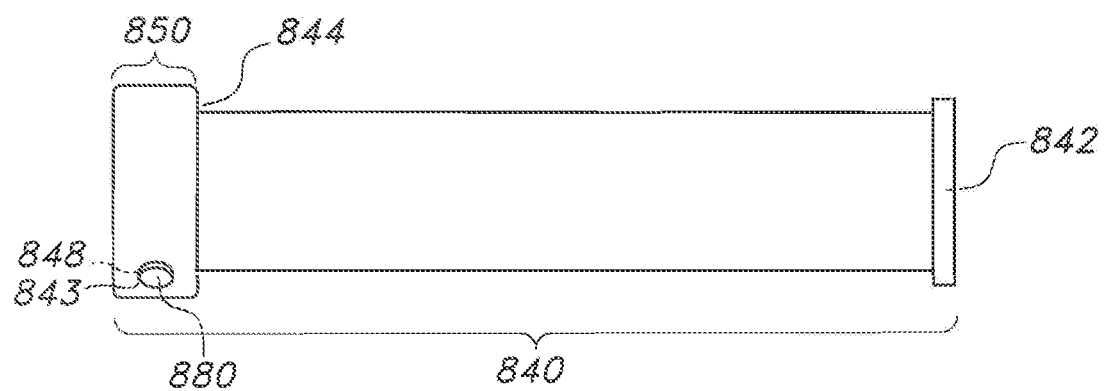
FIG. 11A-D depicts a perspective view of the one embodiment disclosed mining pin with retainer. Individually.
Figure 11B:
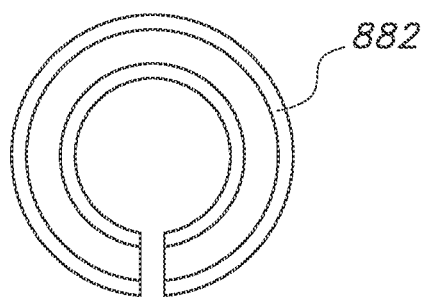
Figure 11C:
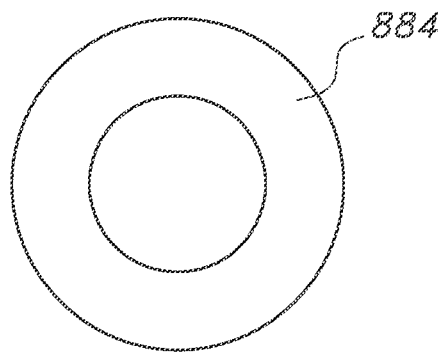
Figure 11D:
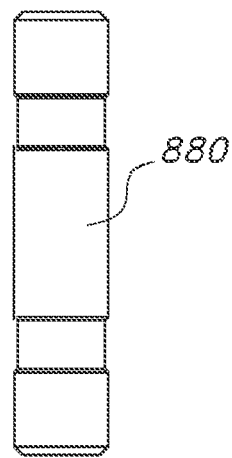

FIG. 11A shows another embodiment of a drive pin retention system. In this embodiment, the retainer 850 is placed over the fastener end 844 of the drive pin 840 (as numbered similarly to FIG. 6). However, in this embodiment, the retainer 850 has two holes 843 that pass all the way through the sidewalls of the retainer along the diameter of the retainer. The drive pin 840 similarly has a drive pin hole 848 that passes through the drive pin 840. FIG. 11D depicts a dowel pin 880 having two notched sections in the surface of the dowel pin such that the diameter at the notched sections is smaller than the diameter of the rest of the dowel pin 880. The dowel pin 880 is intended to pass through the retainer 850 and the drive pin 840. FIG. 11B depicts a retainer ring 882 having an interior diameter slightly larger than the diameter of the notched section, but smaller than the diameter at the unnotched section. The retainer ring 882 is able to open up slightly under pressure to accommodate the wider sections of the dowel pin 880. This is accomplished by having the retainer ring 882 be C-shaped so that it can be forced to open wider. Alternatively, the retainer ring 882 can be made of a flexible material that allows it to open wider. FIG. 11C depicts a plastic seal 884 that is used to hold the retainer ring 882 in place in the holes 848 of the drive pin 840. The plastic seal 884 also helps prevent the steel pieces from weakening as they rub against each other. A plastic seal 884 and retainer ring 882 are used on each side of the drive pin 840 to keep the dowel pin 880 in place.

As will be appreciated from FIG. 11A-D, the notched dowel pin 880 is held in place by two retainer rings 882 located in the holes 848 of the drive pin 840. Each of the two retainer rings 882 acts individually as a lock to keep the dowel pin 880 in place. The double locking mechanism ensures that the dowel pin 880 stays in place, even if one retainer ring 882 fails.

To operate this drive pin retention system, the retainer 850 is placed over the end of the drive pin 840 such that the holes 843 of the retainer 850 line up with the holes 848 of the drive pin 840. The dowel pin 880 is then hammered through the first hole 843 of the retainer 850 and to the first hole 848 of drive pin 840 which has a retainer ring 882 against its opening, held in place by the plastic seal 884. The hammering of the dowel pin 880 causes the retainer ring 882 to open up as the dowel pin 880 is squeezed through. As the hammering continues, the dowel pin 880 will then pass through the second retainer ring 882 causing it to open up. As the leading notch of the dowel pin 880 passes through the second retainer ring 882, the retainer 850 closes around the leading dowel pin notch. The first retainer ring 882 will then also close around the trailing notch. Thus, each retaining ring 882 will be wrapped tightly in a closed position around the notches of the dowel pin 880.

In other potential embodiments of a drive pin retention system where a drive pin 840, dowel pin 880, and retainer 850 are used, the dowel pin 880 is fitted through the holes 843 of a retainer 850 aligned with the holes 848 of the drive pin 840 and pressed with force so that the tolerance between the dowel pin 880 and retainer 850 is very close. The retainer 850 is tack welded and then the dowel pin 880 is tack welded to further increase the tolerance as much possible. This increased tolerance prevents loosening or movement of the retainer 850 due to vibration.

Figures 12A, 12B:
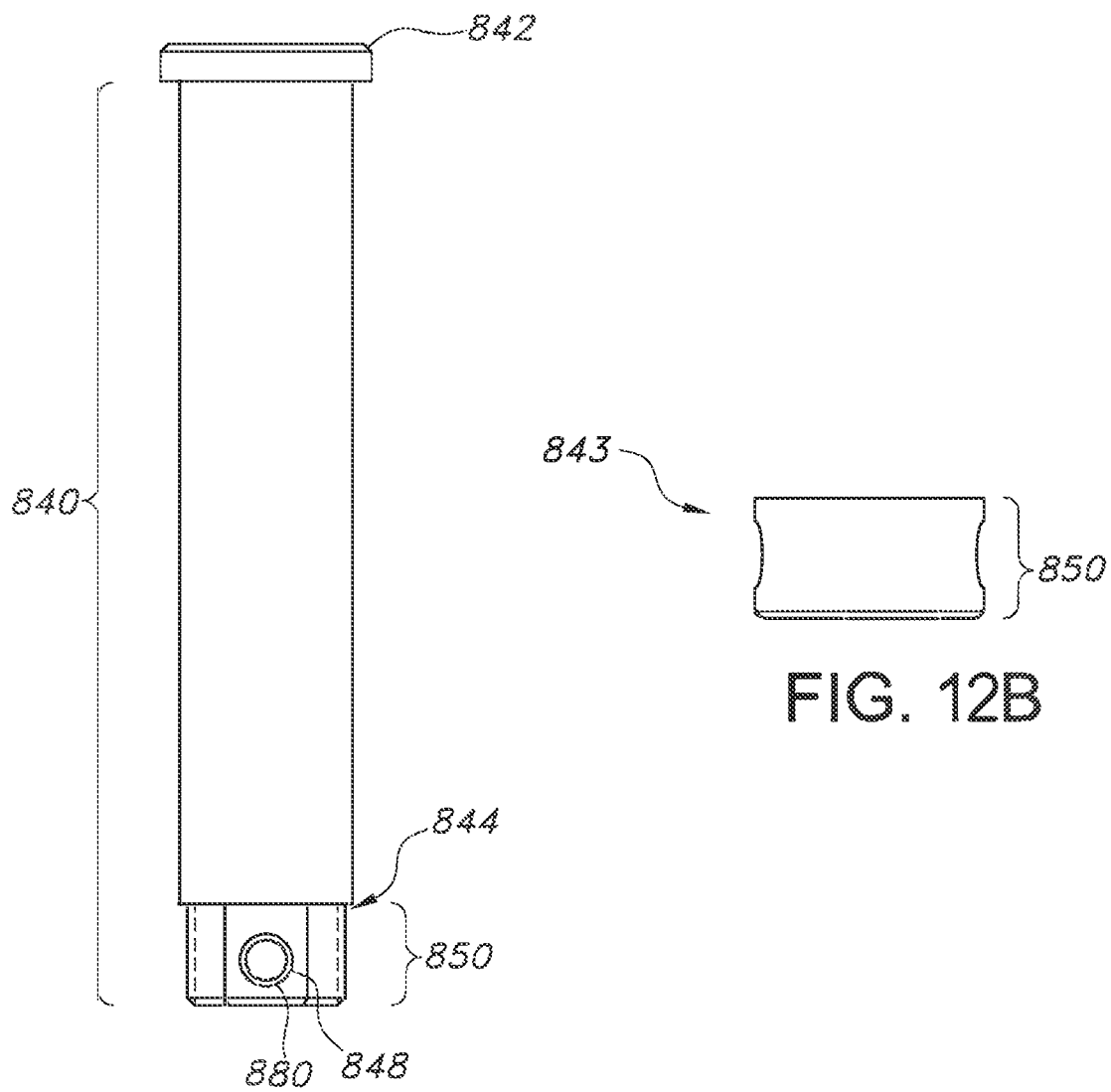
FIG. 12A-B depicts a perspective view of the one embodiment disclosed mining pin with retaining cap and bolt. Individually.
Figure 13A:
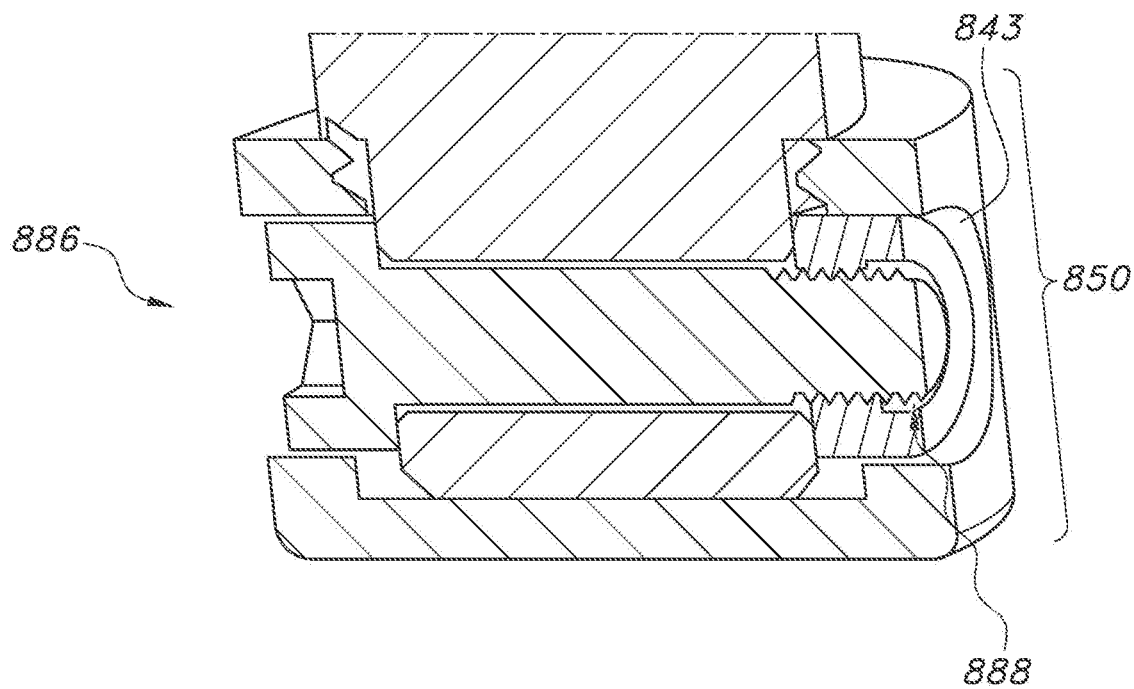
FIG. 13A-B depicts a cross-sectional view of one embodiment of the disclosed mining pin and retaining cap and bolt. Individually.
Figure 13B:
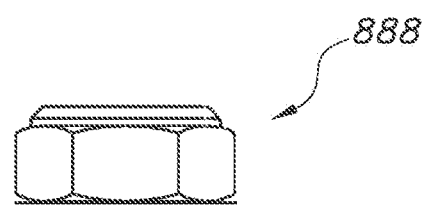

FIG. 12A shows another embodiment of a drive pin retention system. In this embodiment, the retainer 850 is placed over the fastener end 844 of the drive pin 840 (as numbered similarly to FIGS. 6 and 11A). However, in this embodiment, the retainer 850 has two holes 843 that pass all the way through the sidewalls of the retainer 850 along the diameter of the retainer 850 as shown in FIG. 12B. FIG. 13A depicts a bolt 886 which is passed into the interior of the drive pin hole 848 and secured by a nyloc nut 888 as shown in FIG. 13B. The nylon component of the nyloc nut 888 has a smaller inside diameter than the actual nut, thereby acting to lock the nut in place by squeezing the nylon firmly around the bolt when tightened. Unlike a standard locking washer, the nyloc nut 888 prevents the nut from loosening under vibration as the nylon is tightly wedged into the bolt thread and provides resistance to turning once tightened.

Figure 14:
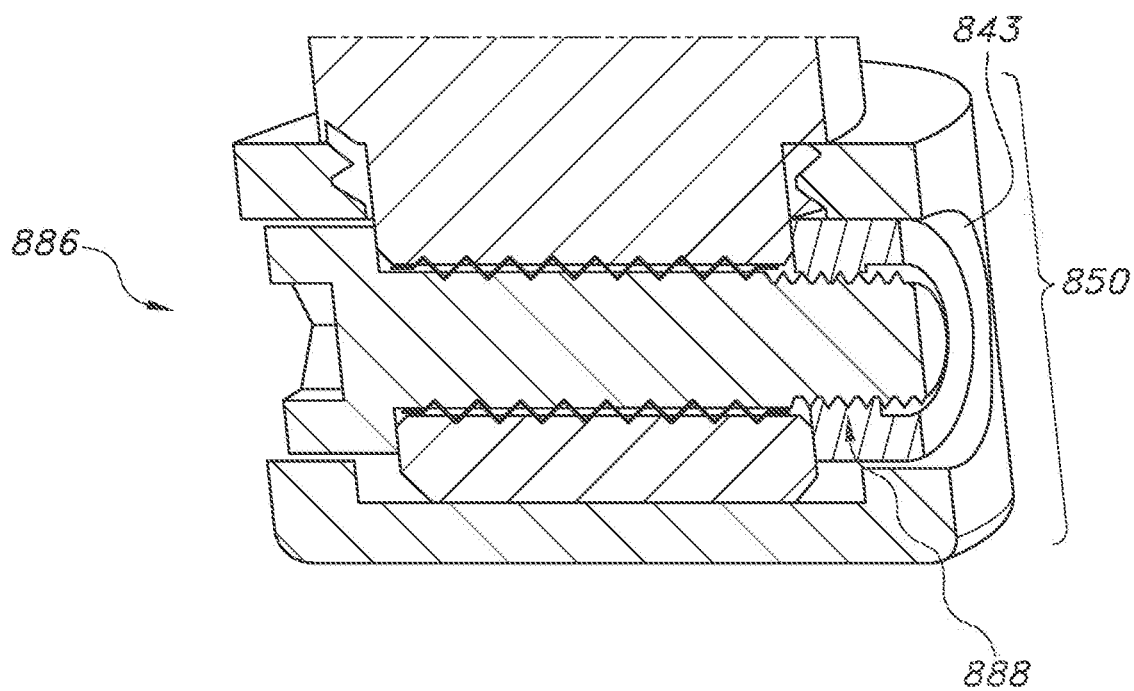
FIG. 14 depicts a cross-sectional view of one embodiment of the disclosed mining pin and retaining cap with fully threaded bolt.
Figure 15:
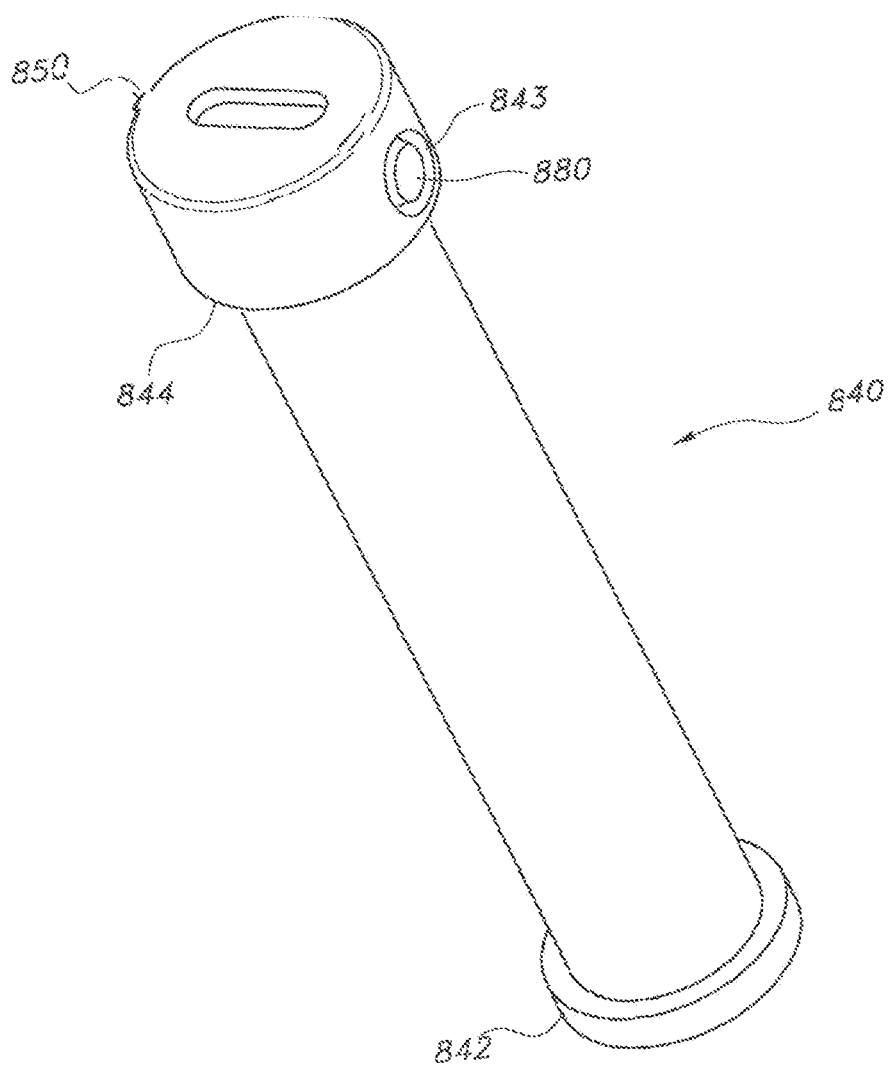
FIG. 15 depicts a perspective view of one embodiment of the disclosed mining pin and retainer.

In other potential embodiments of a drive pin retention system, a socket head style bolt can be used. Alternatively a fully threaded bolt as shown in FIG. 14 is passed into the interior of the drive pin hole 848 and secured by a nyloc nut 888 to strengthen the retention system and ensure the drive pin 840 does not loosen due to vibration.

It should be appreciated that the cutting link 400 and the pin retention mechanism does not require a whole new mining chain, but instead can be employed by replacing specific links or the retainer cap. Furthermore, although the invention has been described for use with mining, it can be used in other applications, such as trencher chains. The pin retention system can also be used in any chain application.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

We claim:

1. A retention system for a drive pin of a chain, comprising:
   a. a drive pin having a pin head disposed at one end and a fastener end at the opposite end, wherein the fastener end defines two drive pin holes aligned along a diameter of the drive pin;
   b. a retainer cap positioned over and receiving the fastener end of the drive pin, the retainer cap defining two retainer pin holes aligned with the drive pin holes and
   c. a locking mechanism including a dowel pin pressed with force through the retainer pin holes of said retainer cap and the drive pin holes of said drive pin to form a press fit between the dowel pin and the drive pin holes and the retainer pin holes, wherein the dowel pin is tack welded to the retainer cap, and wherein the retainer cap is welded to the drive pin.

2. A retention system for the drive pin of a chain wherein said retention system comprises:
   a. a drive pin having a pin head disposed at one end and a fastener end at the opposite end, wherein the fastener end defines two drive pin holes aligned along a diameter of said drive pin;
   b. a retainer cap positioned over and receiving the fastener end of said drive pin, said retainer cap defining two retainer pin holes aligned with the drive pin holes and
   c. a locking mechanism for securing said retainer cap to said drive pin, said locking mechanism comprising a dowel pin configured to be pressed with force through the retainer pin holes of said retainer cap and the drive pin holes of said drive pin to form a press fit, and further wherein the dowel pin is tack welded to the retainer cap, and further wherein the tack weld is configured to allow for an increased tolerance between the dowel pin and the retainer cap, and further wherein the increased tolerance is configured to prevent loosening or movement of the retainer cap relative to the drive pin, and wherein the retainer cap is welded to the drive pin.

3. The retention system of claim 1 wherein said locking mechanism further comprises a c-shaped ring, further wherein said dowel pin has at least one notch that is capable of being secured by the c-shaped ring that closes around said notch.

* * * * *